United States Patent Office
3,501,476
Patented Mar. 17, 1970

3,501,476
PHENAZINEDIONE DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed Mar. 20, 1968, Ser. No. 714,433
Int. Cl. C07d 51/80
U.S. Cl. 260—266
3 Claims

ABSTRACT OF THE DISCLOSURE

Polycyclic derivatives of phenazinediones (I), particularly 11,12-dihydroxy-dibenzo[a-c]phenazine-10,13-dione (Ia) and 4,5-dihydro-9,10-dihydroxyindo[4,3a,3-ab]phenazine-8,11-dione (Ib) are prepared by reacting rhodizonic acid (II) with diaminophenanthrene (III) or diaminoacenapthene (IV), respectively. Compounds (I) are biocidally-active, especially as amebicides.

This invention relates to phenazinediones and more particularly to polycyclic derivatives of phenazinediones. The compounds of this invention are biocidally active, especially as amebicides.

DESCRIPTION OF THE INVENTION

The compounds of this invention are those of Formula I:

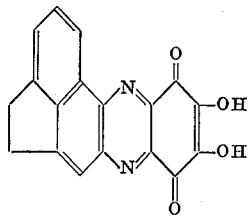

(I)

wherein $R^1$ and $R^2$, taken together, are

—CH=CH—CH=CH— and $R^3$ is H; or $R^2$ and $R^3$, taken together are

—CH$_2$—CH$_2$— and $R^1$ is H.

The embodiments of this invention therefore are 11,12-dihydroxy-dibenzo[a,c]phenazine-10,13-dione, a compound of Formula I wherein $R^1$ and $R^2$, taken together, are

—CH=CH—CH=CH— and $R^3$ is hydrogen; in other words, a compound of Formula Ia:

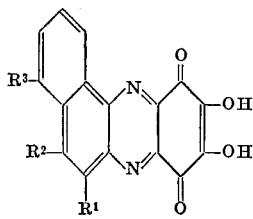

(Ia)

and 4,5-dihydro-9,10-dihydroxyindino-[4,3a,3-a,b]-phenazine-8,11-dione, a compound of Formula I wherein $R^1$ and $R^2$, taken together, are —CH$_2$—CH$_2$— and $R^3$ is H; in other words, a compound of Formula Ib:

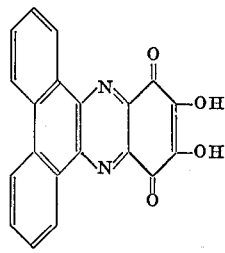

(Ib)

Compounds of Formula I can be prepared in several ways. One especially convenient way is to react rhodizonic acid (II) or a salt thereof, e.g., the dipotassium salt of rhodizonic acid with either a diaminophenanthrene (III) if compounds of the Formula Ia type are desired or a diaminoacenaphthene (IV) if compounds of the Formula Ib type are desired. The reaction is carried out in the presence of an acidic promotor, e.g., a mineral acid such as sulfuric acid is useful. An organic solvent, such as a lower alkanol, is used and best results are obtained if the reaction temperature, is from about 25° C. to about 100° C. Under these conditions the desired product usually precipitates after about three hours and it can be recovered by filtration or other standard techniques. If desired, the product of Formula I can be purified by recrystallization from a suitable medium, for example a mixture of dimethylacetamide and water, or ethyleneglycol dimethyl ether and the like.

The reaction pathway mentioned above can be shown as follows:

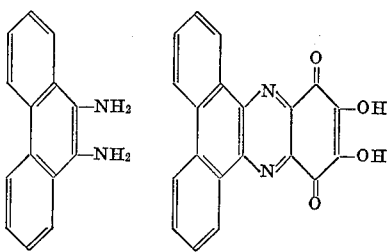

(III)     Ia

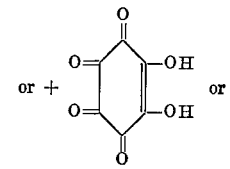

II

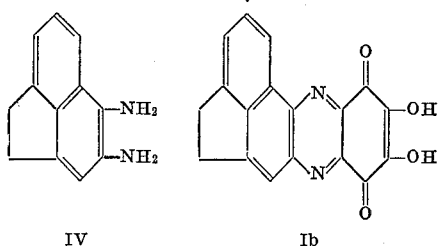

IV     Ib

The compounds of Formula I of this invention have been found to possess biocidal activities, mainly in that they are inimical in very small amounts of the order of 500 μg./ml. in aqueous media to the growth of ameba, such as the pathogenic ameba, *Endameba histolytica*.

These compounds are thus useful in biocidal compositions in a variety of important fields of use. For example, they can be formulated and used in amebicidally active industrial cleaning compositions, and in soaps and detergents intended for veterinary use and in amebicidally active wash solutions to decontaminate premises, pastures, animal cages and the like, which have been infected with amebae. They will be applied according to end-use as powders, solutions, suspensions and the like, containing the active substance generally in concentrations of 0.1% to 0.7% by weight, or even as much as 1%, 1.5%, 1.8%, 2% and up to about 5%. In washing solutions for pastures and barns, the active compounds of this invention will be used generally in the range of from about 0.02% to .25% by weight.

Although, in common with most organic substances with relatively high molecular weights, compounds of Formula I have limited solubility in water, those skilled in the art will have no great difficulty in formulating them into a wide variety of biocidally active compositions. In general, standard techniques can be employed and, where necessary, advantage is taken of the ability of compounds of Formula I to form salts, such as sodium or potassium salts, with bases, which have enhanced solubility in water. The active compounds per se can be made up in dilute aqueous solution. They can, in addition, where required be made up into more concentrated formulations with solvents such as N,N-dimethylacetamide or ethylene glycol dimethyl ether and the like. They can also be formulated as suspensions or solutions in an aqueous vehicle containing an organic co-solvent, such as, for example, N,N-dimethylacetamide. Also, aqueous vehicles containing emulsifying agents, such as sodium lauryl sulfate, and relatively high concentrations, e.g., up to about 5% by weight, of the compounds of Formula I can be formulated by conventional techniques.

DESCRIPTION OF THE PREFERRED EMBODIMENTS

Example 1

11,12-DIHYDROXYDIBENZO-[a,c]-PHENAZINE-10,13-DIONE

A suspension of 2.1 g. of 9,10-diaminophenanthrene, 300 ml. of ethanol and 50 ml. of 2 N sulfuric acid is added to a solution of 2.5 g. of rhodizonic acid dipotassium salt in 50 ml. of 2 N sulfuric acid. The reaction mixture is stirred for three hours at 70-75° C. and the resulting precipitate filtered after about 16 hours. Recrystallization from a mixture of N,N-dimethylacetamide and water affords 1.5 g. of the product, M.P. >300° C.

Analysis.—Calcd. for $C_{20}H_{14}N_2O_4 \cdot \frac{1}{2}H_2O$ (percent): C, 68.94; H, 3.09; N, 7.66. Found (percent): C, 68.37; H, 3.16; N, 7.98.

Example 2

4,5-DIHYDRO-9,10-DIHYDROXYINDINO-[4,3a,3-a,b]-PHENAZINE-8,11-DIONE

A suspension of 3.2 g. of 4,5-diaminoacenaphthene, 100 ml. of 2 N sulfuric acid and 100 ml. of ethanol is added to a solution of 4.5 g. of rhodizonic acid dipotassium salt in 50 ml. of sulfuric acid. The reaction mixture is stirred for 6 hours at about 22° C., and the resulting precipitate is filtered. Recrystallization from ethyleneglycol dimethyl ether affords 2.5 g. of the product, M.P. 300° C.

Analysis.—Calcd. for $C_{18}H_{10}N_2O_4$ (percent): C, 61.01; H, 3.98; N, 7.91. Found (percent): C, 60.72; H, 3.63; N, 7.88.

What is claimed is:

1. A compound of the formula:

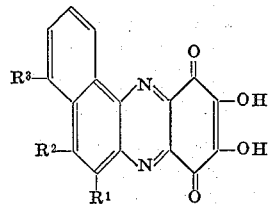

wherein $R^1$ and $R^2$, taken together, are

—CH=CH—CH=CH— and $R^3$ is H; or $R^2$ and $R^3$, taken together are

—CH$_2$—CH$_2$— and $R^1$ is H.

2. A compound as defined in claim 1, which is 11,12-dihydroxydibenzo-[a,c]-phenazine-10,13-dione.

3. A compound as defined in claim 1, which is 4,5-dihydro - 9,10 - dihydroxyindino - [4,3a,3-a,b] - phenazine-8,11-dione.

References Cited

UNITED STATES PATENTS 3,047,575    7/1962    Boyle et al. _____ 260—266

ALEX MAZEL, Primary Examiner

ANNE MARIE T. TIGHE, Assistant Examiner

U.S. Cl. X.R.

424—250